H. H. KURKJIAN.
POWER TRANSMISSION DEVICE.
APPLICATION FILED OCT. 15, 1917.
1,289,818.
Patented Dec. 31, 1918.
2 SHEETS—SHEET 1.
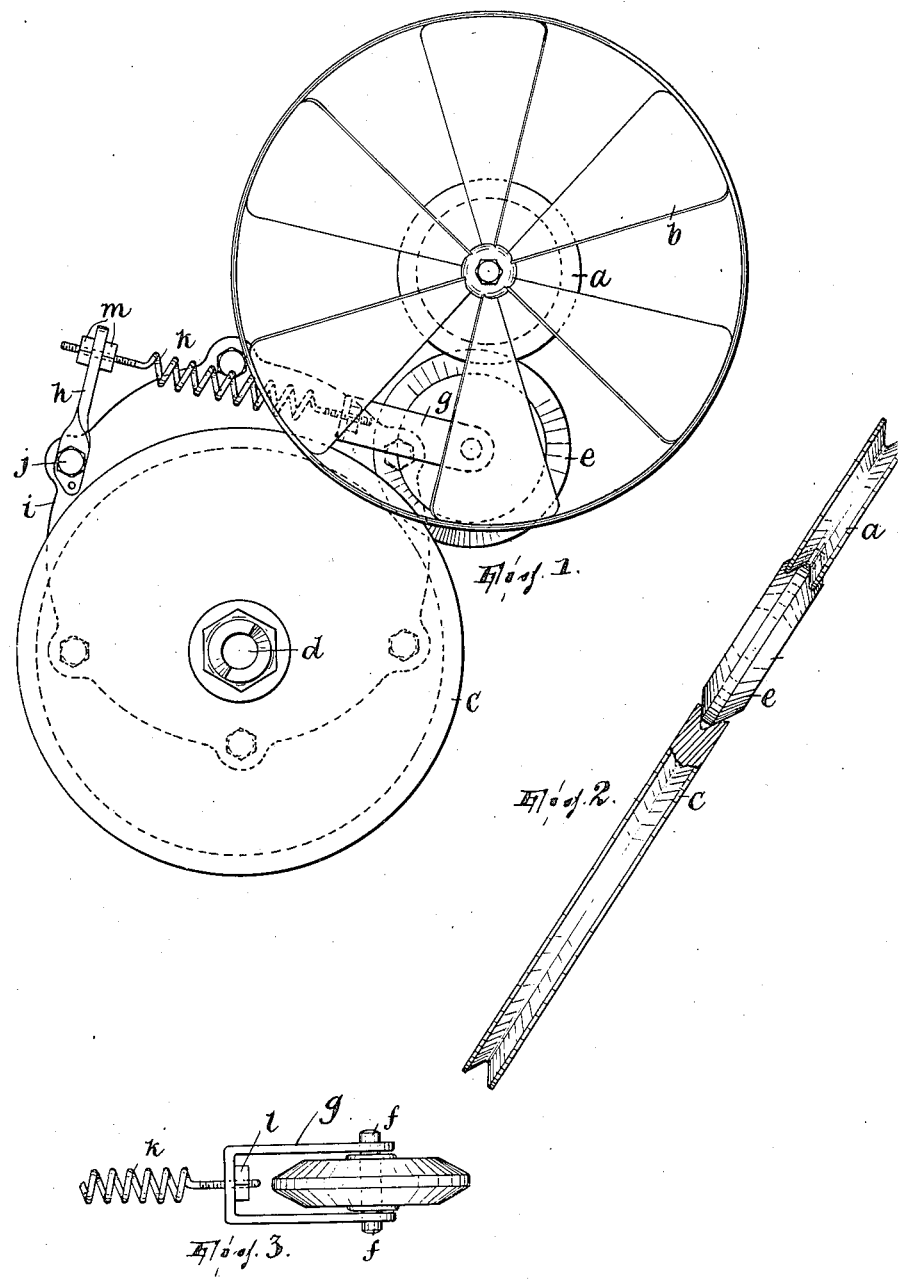
WITNESS:
Wm D Bell
INVENTOR,
H.H. Kurkjian,
BY
ATTORNEY.

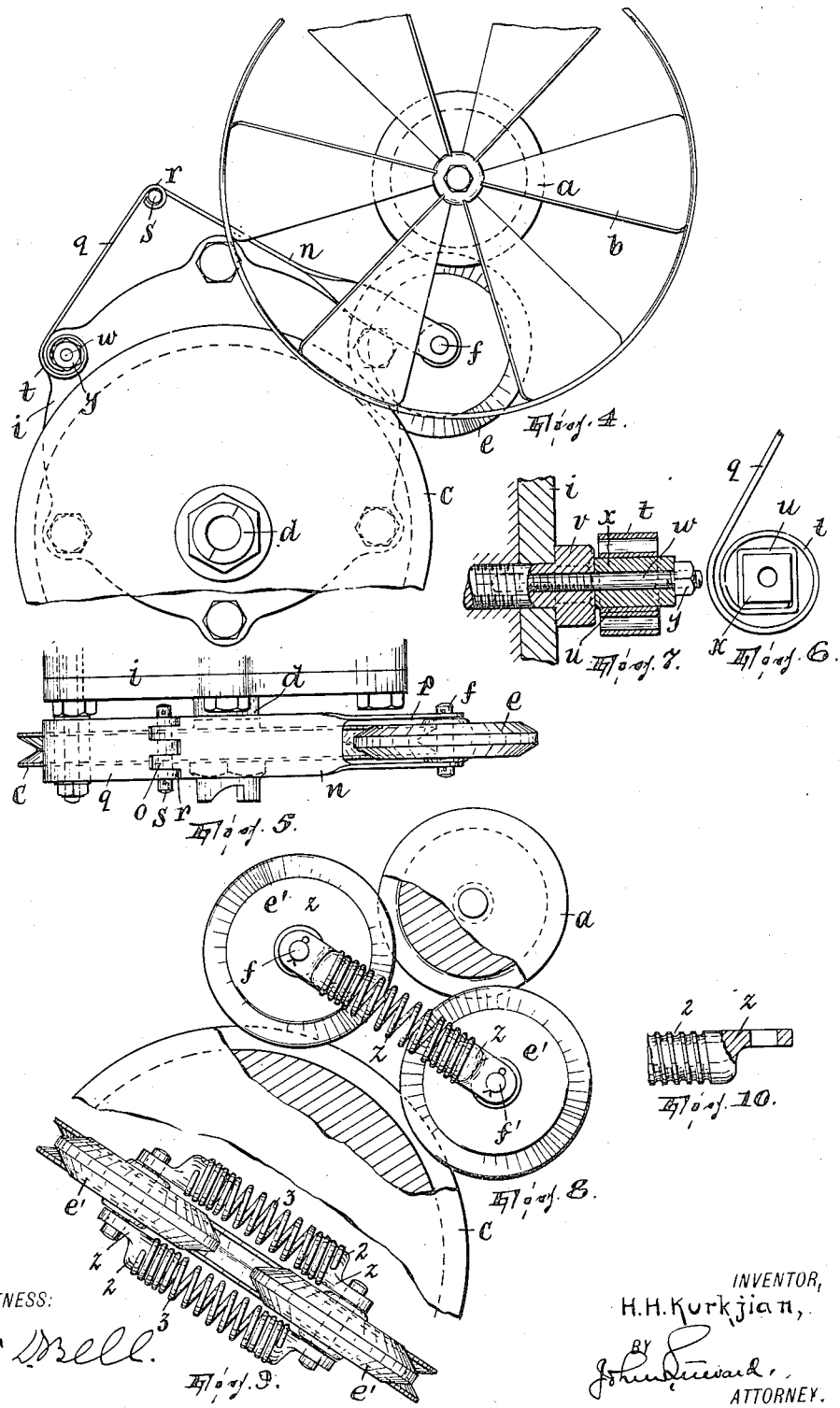

UNITED STATES PATENT OFFICE.

HAIGAZN H. KURKJIAN, OF PATERSON, NEW JERSEY.

POWER-TRANSMISSION DEVICE.

1,289,818.  Specification of Letters Patent.  Patented Dec. 31, 1918.

Application filed October 15, 1917. Serial No. 196,584.

*To all whom it may concern:*

Be it known that I, HAIGAZN H. KURKJIAN, a citizen of the United States, residing at Paterson, in the county of Passaic and State of New Jersey, have invented certain new and useful Improvements in Power-Transmission Devices, of which the following is a specification.

My invention relates to friction transmission means and it has for its principal object to provide a transmission means, simple and inexpensive in construction and capable of being readily applied, that may be used in place of a belt to reduce to the minimum slippage or lost-motion as between the driving and driven members which characterizes the use of a belt as soon as the latter stretches and therefore ceases to grip said members effectively. My invention has been devised with special reference to the transmission of power from the main or cam shaft to the fan shaft of an automobile engine, but it is of course useful in other adaptations. In one aspect of my invention it is an important and distinguishing feature that the rotary transmission element thereof has in effect, a tongue-and-groove peripheral engagement with the driving and driven members, being of greater diameter than the space between them, and that elastic pull means normally holds said transmission element pressing against said members; for, as distinguished from means of this class in which the transmission element is held against the driving and driven members by elastic push means, my arrangement eliminates the disposition of the parts to buckle and so conduces considerably to simplicity of construction.

In the accompanying drawings, illustrating three different forms of my invention, Figure 1 is a front elevation of one form of my invention in operative relation to driving and driven members in an automobile engine;

Fig. 2 is a side elevation of the driving and driven members and the transmission element of my device, one of said members being shown partly in section;

Fig. 3 is a fragmentary plan of that form of the device shown in Fig. 1;

Fig. 4 is a view similar to Fig. 1, but illustrating another form of the invention;

Fig. 5 is a plan view of that form of the device appearing in Fig. 4;

Fig. 6 is a side elevation, and Fig. 7 a sectional view of the elastic means shown in Fig. 4;

Fig. 8 is a front elevation of the third form, showing the driving and driven members partly in section;

Fig. 9 is a plan of the device shown in Fig. 8; and

Fig. 10 shows a detail of the device shown in Fig. 8.

Referring, first, to that form of the invention shown in Figs. 1, 2 and 3, $a$ is the rotary driven member on the shaft carrying the fan $b$ of an automobile engine and $c$ is the rotary driving member on a shaft $d$, such as the main or cam shaft, of the engine. $e$ is the rotary transmission element of my invention. Element $e$ is in the same plane as members $a$ and $c$ and has a diameter greater than the space between said members; element $e$ has a tongue-and-groove peripheral engagement with members $a$ and $c$, produced, as here illustrated, by forming members $a$ and $c$ with peripheral grooves and element $e$ V-shaped in cross-section.

Element $e$ has an arbor $f$ whose ends project therefrom, and it is received by a U-shaped clip $g$ in whose ends the ends of the arbor are journaled. Element $e$ being arranged at one side of a straight line which connects the axes of members $a$ and $c$, at the other side of said line a bracket $h$ is attached to some fixed support, as the part $i$ of the engine. The bracket is here shown as an arm held in place by a single cap screw $j$ penetrating it, so that it may be adjusted around the cap screw as an axis.

$k$ is a spiral spring having its ends extending longitudinally and threaded, one penetrating the clip $g$ in the central plane of element $e$ and the other penetrating the end of arm $h$; the former end is equipped with a nut $l$ to bear against the inside of the clip and the other end is equipped with a pair of nuts $m$ which clamp the arm between them and which may be shifted on the threaded end of the spring in altering the tension thereof.

Since the parts $a$, $e$, $c$ have a tongue-and-groove peripheral engagement with each other and the means $g$, $k$ and $h$ is a pull means it will be obvious that, not only is the transmission of a substantially perfect non-slip character, but element $e$ remains in perfect tracking and otherwise operative relation to members $a$ and $c$, without expedients to guide it and insure such relation.

In that form of the invention shown in Figs. 4 to 7, the clip is a strip $n$ having one end $o$ formed as a hinge-part and the other end formed with a slot $p$ to receive the transmission element $e$ (having an arbor $f$ and being otherwise the same as the element $e$ already described) the material of the strip both sides of the slot $p$ being bent up so as to lie in parallel planes and affording journals for the arbor $f$. A spring arm $q$, having one end a hinge-part $r$ connected with the hinge-part $o$ by the pintle $s$, has its other end formed as a helix $t$ and the extremity $u$ of said latter end shaped to the form of a polygon. Into a cap screw $v$ forming a part of the support $i$ is tapped a threaded pin $w$ on which is pivoted a polygonal block $x$ which the part $u$ of arm $q$ fits (Fig. 6). To adjust the tension of the arm $q$ the block may be turned on the pin $w$ and then secured fast by a nut $y$ screwed on the free end of the pin. Enough of the block projects as shown in Fig. 7 to afford a wrench-hold.

In the construction shown in Figs. 8 to 10 there are two rotary transmission elements $e'$ $e'$ having arbors $f'$ $f'$, and being otherwise like the element $e$ already described; they are arranged on opposite sides of a straight line adjoining the axes of the members $a$ and $c$ and the elastic means to hold each bearing against said members connects them, thus: On the end of each arbor is a bearing piece $z$ having a threaded shank 2, and the corresponding bearing pieces of the two elements $e'$ are connected by a spring 3 whose ends receive the shanks 2 and have their convolutions engaged in the threading thereof.

The elements $e$ (or $e'$) are preferably composed of fiber or some other material which will obtain an effective noiseless grip on the members $a$, $c$.

Having thus fully described my invention, what I claim as new and desire to secure by Letters Patent is:—

1. In combination, with a support and spaced rotary driving and driven members journaled therein in the same plane, a rotary transmission element of greater diameter than the space between and having a tongue-and-groove peripheral engagement with said members, and elastic pull means holding the transmission element pressing against both of said members.

2. In combination, with a support and spaced rotary driving and driven members journaled therein in the same plane, a rotary transmission element of greater diameter than the space between and having a tongue-and-groove peripheral engagement with said members and elastic pull means, engaged with said element at both sides thereof, holding the transmission element pressing against both of said members.

3. In combination, with a support and spaced rotary driving and driven members journaled therein in the same plane, a rotary transmission element of greater diameter than the space between and having a tongue-and-groove peripheral engagement with said members, and elastic pull means, including a fork in which said element is journaled, holding said element pressing against both of said members.

4. In combination, with a support and spaced rotary driving and driven members journaled therein in the same plane, a rotary transmission element of greater diameter than the space between and having a tongue-and-groove peripheral engagement with said members, and elastic pull means, including an attaching device secured to the support and a part affording a journal for said element and connecting the same with said device, normally holding said element pressing against both of said members.

5. In combination, with a support and spaced rotary driving and driven members journaled therein in the same plane, a rotary transmission element of greater diameter than the space between and having a tongue-and-groove peripheral engagement with said members, and elastic means normally holding said element pressing against both of said members and attached to said support, said means being adjustable on an axis parallel with the axes of said members and element.

6. In combination, with a support and spaced rotary driving and driven members journaled therein in the same plane, a rotary transmission element of greater diameter than the space between and having a tongue-and-groove peripheral engagement with said members, and elastic means normally holding said element pressing against both of said members, said means including an arm attached to said support and having its attaching end a helical spring.

7. In combination, with a support and spaced rotary driving and driven members journaled therein in the same plane, a rotary transmission element of greater diameter than the space between and having a tongue-and-groove peripheral engagement with said members, and elastic means normally holding said element pressing against said members, said means including a spring arm and an attaching device to which one end of said arm is secured rotatably adjustably mounted on the support.

8. In combination, with a support and spaced rotary driving and driven members journaled therein in the same plane, a pair of rotary transmission elements of greater diameter than the space between and having a tongue-and-groove peripheral engagement with and arranged on opposite sides of a straight line joining the axes of said members, and elastic means joining said members and holding each pressing against both of said members.

In testimony whereof I affix my signature.

HAIGAZN H. KURKJIAN.